United States Patent [19]
Czubak

[11] 3,884,789
[45] May 20, 1975

[54] APPARATUS FOR FINISHING TROCHOIDAL SURFACES

[75] Inventor: Albin S. Czubak, Holland, Mich.

[73] Assignee: Ex-Cell-O Corporation, Detroit, Mich.

[22] Filed: Feb. 22, 1973

[21] Appl. No.: 334,734

[52] U.S. Cl............ 204/224 R; 204/38 B; 204/215; 204/224 M; 204/DIG. 10
[51] Int. Cl. ........................ B01k 3/00; C23b 5/68
[58] Field of Search ....... 204/DIG. 10, 38 B, 224 R, 204/224 M, 215, 216, 217

[56] References Cited
UNITED STATES PATENTS

| | | | |
|---|---|---|---|
| 3,706,650 | 12/1972 | Eisner | 204/217 |
| 3,774,346 | 11/1973 | Hoglund | 51/90 |
| 3,806,441 | 4/1974 | Rowe | 204/224 R |

FOREIGN PATENTS OR APPLICATIONS

| | | | |
|---|---|---|---|
| 18,643 | 8/1900 | United Kingdom | 204/DIG. 10 |
| 1,200,410 | 7/1970 | United Kingdom | 204/273 |

*Primary Examiner*—F. C. Edmundson
*Attorney, Agent, or Firm*—Price, Heneveld, Huizenga & Cooper

[57] ABSTRACT

Apparatus for finishing the inner surface of a workpiece having an epitrochoidal configuration as, for example, the combustion chamber casting of a rotary internal combustion engine. A special mounting assembly adapted for eccentric rotation about a mandrel includes a tool holder for supporting tools which operate on the epitrochoid-shaped inner surface of the workpiece. Drive means for the mounting assembly include a rotatable spindle having a cam fixed thereon which urges the mounting assembly and tool holder to orbit about the mandrel. A fixed gear on the mandrel and a ring gear on the mounting assembly control the rotation in a timed relationship as the ring gear is urged to orbit about the fixed gear to cause a tool carried on the tool holder to describe an epitrochoidal path and thereby follow along the inner surface of the workpiece.

9 Claims, 10 Drawing Figures

APPARATUS FOR FINISHING TROCHOIDAL SURFACES

BACKGROUND OF THE INVENTION

This invention relates to an apparatus for following the surface contour of a workpiece having an epitrochoidal configuration as, for example, the combustion chamber of a "Wankle"-type rotary engine. More specifically, the apparatus of the present invention relates to a holder and driving means therefor which is adapted to circumscribe an epitrochoidal arc and carry tools, plating anodes or the like, mounted on the holder along such inner surfaces. Typically, the rotor housing or combustion chamber of such rotary engines is made of an aluminum alloy casting and its inner surface, forming the combustion chamber, is of a waisted oval shape (a two-node epitrochoid curve). The rotor in engines of this type is triangular in shape and seals are installed on the apices of the rotor to slide along the epitrochoid surface of the housing. The surface finish upon which the seals slide is of primary importance. Accordingly, in one aspect of the present invention, the holder is adapted to carry a honing tool which is mounted for reciprocating motion simultaneously with its movement about the epitrochoid surface to impart a precision finish on the surface.

To increase the wear resistance of the combustion chamber, hard chrome plating can be applied on this surface. It is another aspect of the present invention to provide an apparatus for depositing a layer of such chromium plating on this surface. Such plating is accomplished by means of an electroplating process wherein the workpiece forms the cathode and the anode members are rotated about the epitrochoidal-shaped inner surface in a spaced position relative to the surface.

When such surfaces are plated, it is desirable to impart a very fine surface finish thereto as by hone forming. Accordingly, within another aspect of this invention, both honing and electroplating operations are performed simultaneously as the honing and anode tools are urged to advance along and follow the contour of the epitrochoid surface of the rotor housing.

SUMMARY OF INVENTION

According to the present invention, an apparatus is provided for operating on a workpiece having an inner surface in the form of an epitrochoid curve. The apparatus includes a tool holder adapted to carry a tool for movement along the epitrochoid surface. Means are provided for mounting the workpiece with respect to the tool holder and a mandrel carries the tool holder for movement about the surface. Driving means associated with the mandrel and the tool holder urge the holder in an orbital path about the mandrel whereby a tool affixed to the holder follows and epitrochoidal path about the surface. The mandrel provides a housing for a rotatable spindle which is adapted to drive the tool holder in the orbital path. A gear set including a first gear fixed with respect to the mandrel and a ring gear on the tool holder are provided to control the path of rotation. The ring gear engages the fixed gear and synchronizes the eccentric rotation of the tool holder as it is driven about the mandrel such that the holder and tools carried thereby circumscribe and epitrochoidal curve about the inner surface.

DETAILED DESCRIPTION OF THE PREFERRED EMBODIMENT

Figure 1:
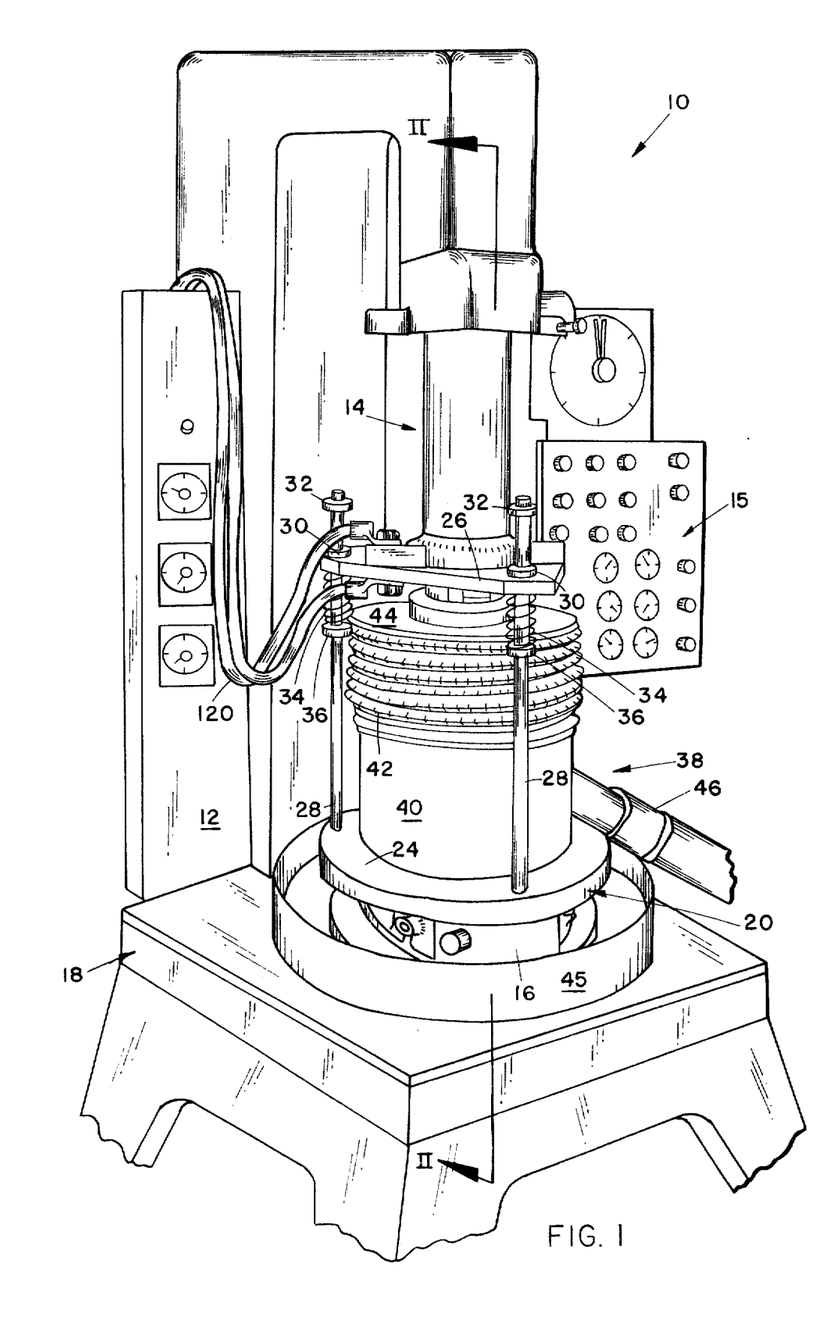
FIG. 1 is a front perspective view of an apparatus incorporating the invention with details of the supporting framework omitted for clarity.

Referring now to the drawings, the preferred embodiment of the apparatus will be described in detail. In FIG. 1 the apparatus generally designated by the numeral 10 includes a supportive frame work 12 having a vertically mounted mandrel assembly 14 and a horizontal work supporting bed 18. The operating controls 15 for the apparatus including the various speed, feed and other control elements are conveniently located at the sides of the supportive framework. A workpiece 16 is shown mounted on bed 18 in line with and directly below mandrel assembly 14. The mandrel assembly is extendable downwardly into operative engagement with the workpiece.

Workpiece 16 is held in position for machining operations by a special releasable holding and clamping fixture generally designated by the numeral 20. The holding fixture includes a lower fixture member 22 secured on bed 18 (FIG. 2) for supporting the workpiece. Locating pins 23 (FIG. 2) extend upwardly from lower fixture member 22 into corresponding recesses cast or otherwise formed in the workpiece. An upper fixture member 24 is adapted to clamp against the top of workpiece 16 when urged downwardly toward the lower fixture member to secure the workpiece therebetween. The upper fixture member also includes locating pins 27 extending downwardly for positioning the upper member with respect to the workpiece. The upper and lower fixture members each have a central cavity formed therein which essentially corresponds to the opening formed by the inner surface of the workpiece. The cavities are slighly larger than that in the workpiece to allow for movement of the tools. Sealing rings 25 in fixture members 22 and 24 provide a fluid tight seal against the sides of the workpiece.

The upper fixture 24 is mounted for vertical movement with respect to the lower supporting fixture so that when raised, a workpiece may be removed or positioned therebetween. The upper clamping fixture is fixed to and movable with mandrel assembly 14 by means of a triangularshaped mounting plate 26 carried by the mandrel. A plurality of spacer and guide rods 28 connected to upper fixture member 24 extend through openings in mounting plate 26. Guide rods 28 are mounted for sliding movement with respect to mounting plate 26 in insulated busings 30 fixed in the mounting plate. Collars 32 secured to the uppermost ends of each guide rod 28 engage with the upper surface of the mounting plate when the mandrel is moving toward its extreme upward position to thereby raise the upper fixture member 24 upwardly away from engaging position with the workpiece. Bias springs 34 and lower collar members 36 positioned on guide rods 28 below mounting plate 26 urge the upper fixture member into clamping engagement with the workpiece when the mandrel assembly is in its downwardly extended position.

Figure 2:
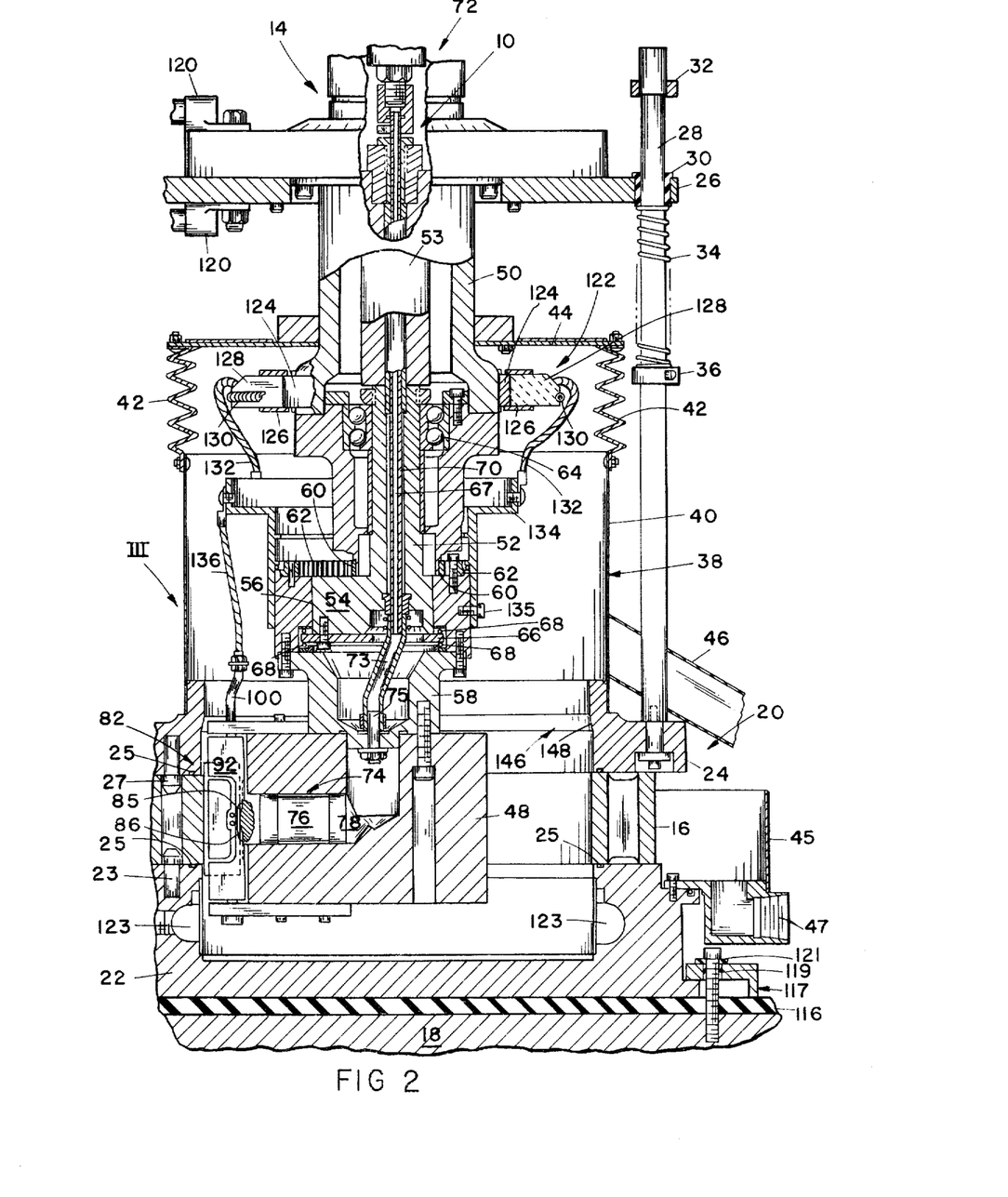
FIG. 2 is a cross-sectional view taken along plane II—II of FIG. 1 illustrating the operating components for urging the tool holder to orbit about the mandrel in an epitrochoidal path.
Figure 3:
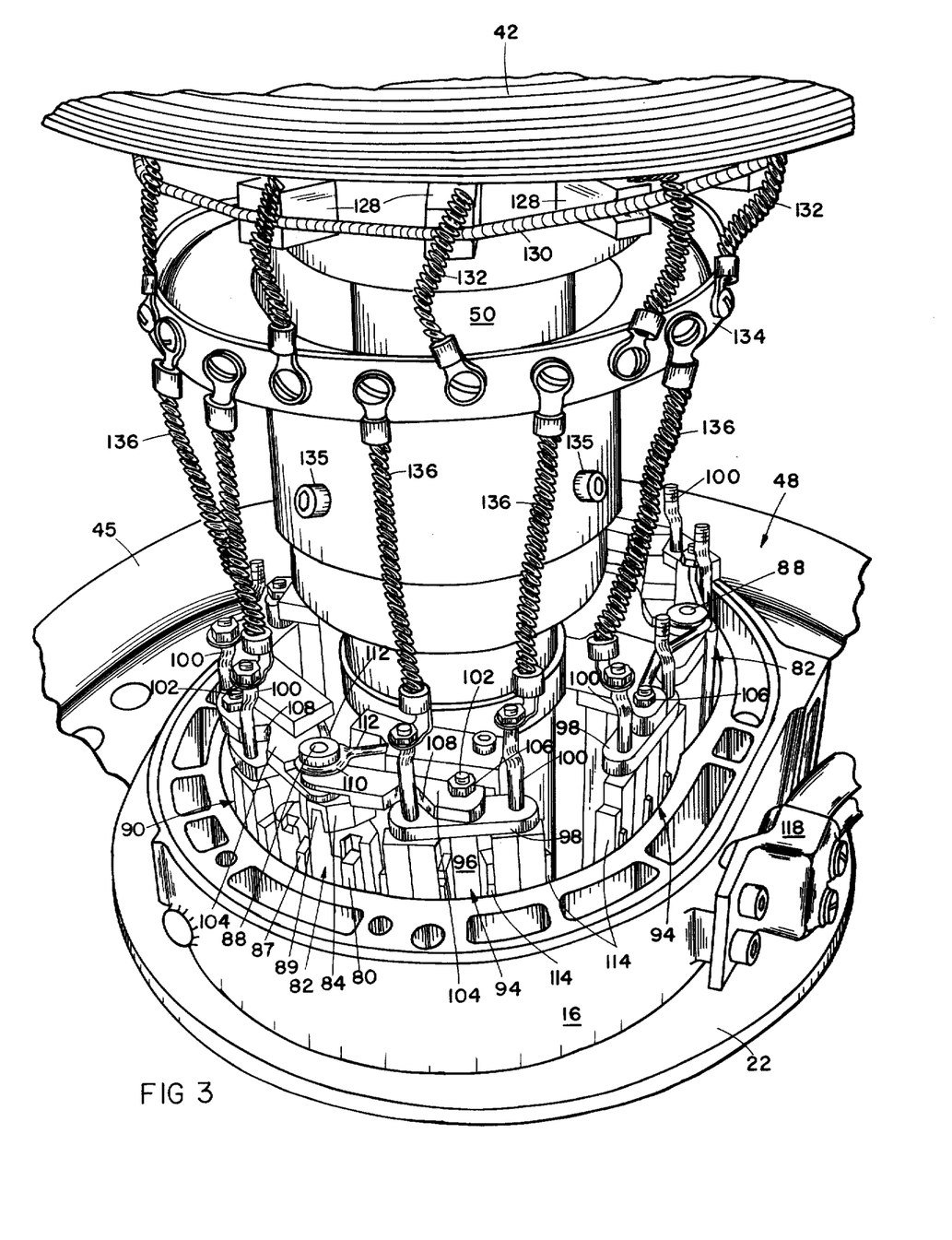
FIG. 3 is a perspective view taken along the arrow III of FIG. 2 illustrating the tool holder and tools carried thereby positioned within a workpiece.

The mandrel assembly 14 is shown in cross section in FIG. 2 and carries the operating components for urging the tool assembly illustrated in FIG. 3 to orbit about an epitrochoidal path to follow the inner surface of the workpiece. These components are carried at the lowermost end of the mandrel and are enclosed within a housing assembly 38 (FIGS. 1 and 2). Housing 38 includes a lower circular shield or container 40 which is provided to contain an electroplating fluid utilized when plating the inerior of the workpiece. A bellows-like assembly 42 extending upwardly from container 40 is secured to a disc 44 carried with the mandrel assembly and mounting plate 26. When honing operations are performed, mandrel assembly 14 is urged to reciprocate in a vertical direction. Mounting plate 26 is free to move with respect to the upper fixture member as bushings 30 in the mounting plate slide along guide rods 28 between collars 32 and 36. Bellows 42 expands and contracts as required to allow this reciprocating movement. Container 40 and upper fixture member 24 remain fixed. An outlet tube 46 extends from the side of container 40 to allow electroplating fluids to flow through the workpiece and container 40 outwardly to a holding tank (not shown) positioned adjacent the end of the outlet. A lower fluid containment ring 45 is fixed around lower fixture member 22 and surrounds workpiece 16 to receive overflow plating fluids which may also flow through the openings in the workpiece. An outlet 47 in ring 45 is provided to drain the fluid into the holding tank.

As previously mentioned, the mandrel assembly 14 is adapted to be reciprocated upwardly and downwardly. The structure for accomplishing this forms no part of the present invention and will therefore not be described in great detail. Reference may be had, however, to commonly assigned U.S. Pat. No. 3,390,068 issued to M. P. Ellis el al. on June 25, 1968, entitled ELECTROPLATE HONING METHOD, for a more detailed description of an electrochemical honing apparatus.

The mandrel assembly includes an outer housing 50 in which a hollow spindle assembly 52 is rotatably mounted. The uppermost end 53 of the spindle extends into the supporting framework where suitable driving means 51 (FIG. 8) as an electric motor are provided to rotate the spindle. The lower end of the spindle has a cam 54 formed thereon which engages a cam follower (which can include a circular bushing if necessary) formed in a hub assembly 58 attached to a tool holder 48. The lowermost end of outer housing 50 converges inwardly toward the spindle shaft and a stationary gear 60 having external teeth is fixed thereon. Hub assembly 58 has a corresponding mating ring or internal gear 62 fixed on its upper surface for engagement and rotation about the fixed, external gear. As cam 54 is rotated by the spindle, ring gear 62 is urged to orbit in an eccentric path about fixed gear 60 to synchronize the rotation of tool holder 48 so that it traces an epitrochoidal path about the inner surface of the workpiece.

The spindle is mounted for rotation on ball thrust bearings 64 positioned midway along the length of the mandrel assembly. A thrust bearing plate 66 attached to the lower end of the spindle and cam supports thrust bearings 68 positioned in a recess formed in hub assembly 58. The spindle assembly moves with the mandrel assembly as the outer housing of the mandrel assembly is reciprocated. Tool holder 48 including hub assembly 58 also follows this reciprocating movement because of the operative connection made by thrust plate 66 in hub assembly 58. Accordingly, both eccentric rotary and reciprocating motion can be imparted to the tool holder and the tools carried thereby.

Figure 4:
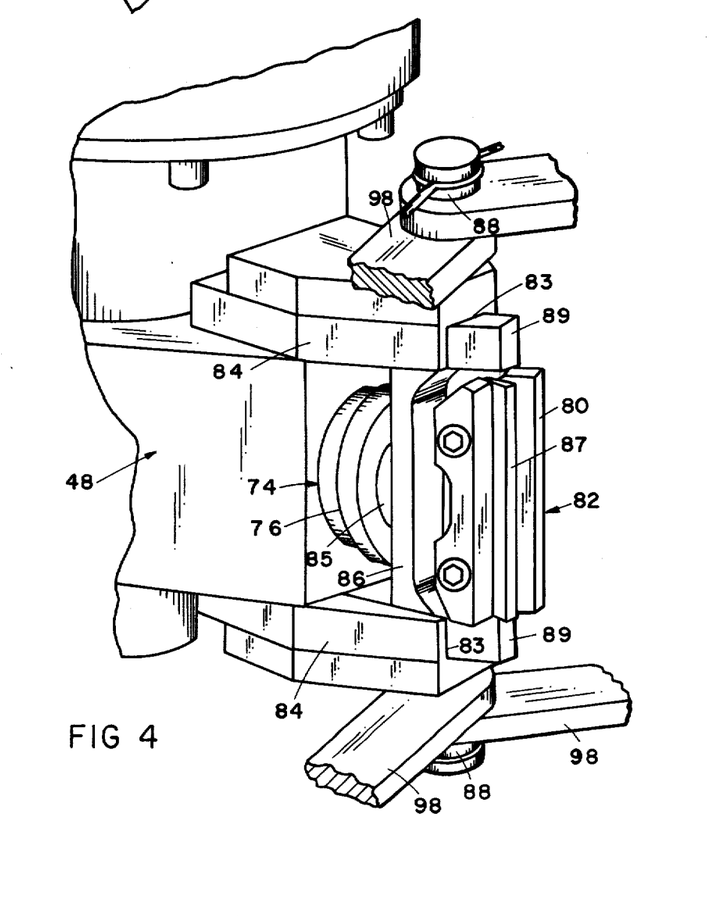
FIG. 4 is a partial fragmentary view in perspective illustrating the mounting of the honing tool in the tool holder.

Spindle 52 is hollowed to form a passageway 67 through which fluid pressure is applied to actuator members 76 carried by the tool holder for urging the honing tools into operative engagement with the workpiece. The passageway includes a length of conduit 70 which extends through the hollow center of spindle 52 upwardly into the supportive framework where it is connected through a rotary coupling 72 to a controllable source of fluid pressure (not shown). The lower end of conduit 70 is connected to the center of the tool holder by means of a short length of flexible tubing 73 connected between the end of conduit 70 and a nipple 75 carried on tool holder 48. As the spindle rotates causing the hub 58, ring gear 62 and tool holder 48 to orbit about fixed gear 60, flexible tubing 73 is allowed to flex and bend as required so that a fluid passageway is provided to apply fluid pressure from the source to actuators 74. As shown also in FIGS. 4 and 5, actuator 74 includes a piston 76 slidably mounted in an opening 78 formed in the tool holder. The application of fluid pressure through the passageway formed by conduit 70 and flexible tubing 74 is applied to one end of piston 76 urging it outwardly thereby causing the tool mounted on the tool holder to move outwardly until it engages the inner surface of the workpiece. Suitable pressure regulating means can be provided to regulate the pressure applied on the piston to thereby control the pressure of the tool against the workpiece surface.

Referring to FIGS. 3 through 6, the tool holder and the honing and plating tools mounted thereon are shown in greater detail. In the preferred embodiment, the tool holder is generally in the shape of a triangle. Hone finishing stones or tools 80 are carried at the apices of the triangular tool holder in holder assemblies 82 which are biased outwardly by actuators 74 into engagement with the inner surface of the workpiece. The holder assembly 82 is generally C-shaped having a back member 86 from which upper and lower arms 89 extend. Tools 80 are carried between the arms parallel to the back member. The holder assembly is mounted for sliding movement with respect to the apex of the triangle by upper and lower channel-like members 84

(FIGS. 4 and 6) secured on the tool holder and which slidably receive arms 89. A channel 83 is formed in channel members 84 and is slightly wider than the arms 89 of stone holder assembly such that it may slide inwardly and outwardly along the channel in response to movement of pistons 76. Suitable biasing means may be provided on the stone holder and tool holder to bias the tools out of workpiece engaging position. The outermost end of the piston in the actuator assembly 74 has a raised projection 85 (FIGS. 2 and 4) in the central portion thereof which abuts back member 86 of holder assembly 82 to allow a slight rocking motion of the vertically oriented stones to compensate for axial misalignment while honing operations are performed on the inner surface of the workpiece. In the preferred embodiment, holder assembly 82 is adapted to carry the honing stone 80 and a plastic guide member 87 which is arranged parallel to stone 80 to cooperatively engage the inner surface of the workpiece with the stone while the rotating and reciprocating motion occurs to provide an extremely fine surface finish.

The assembly thus far described may be utilized for hone forming an epitrochoidal surface. It will be realized, however, that tool holder 48 may be adapted to carry virtually any tool to perform a desired machining operation on a workpiece. In the preferred embodiment illustrated herein, both electroplating and honing operations are performed. The tool holder including honing stones 80 and an electroplating tool anode will be described in greater detail with specific reference to FIGS. 3 through 6.

Figure 5:
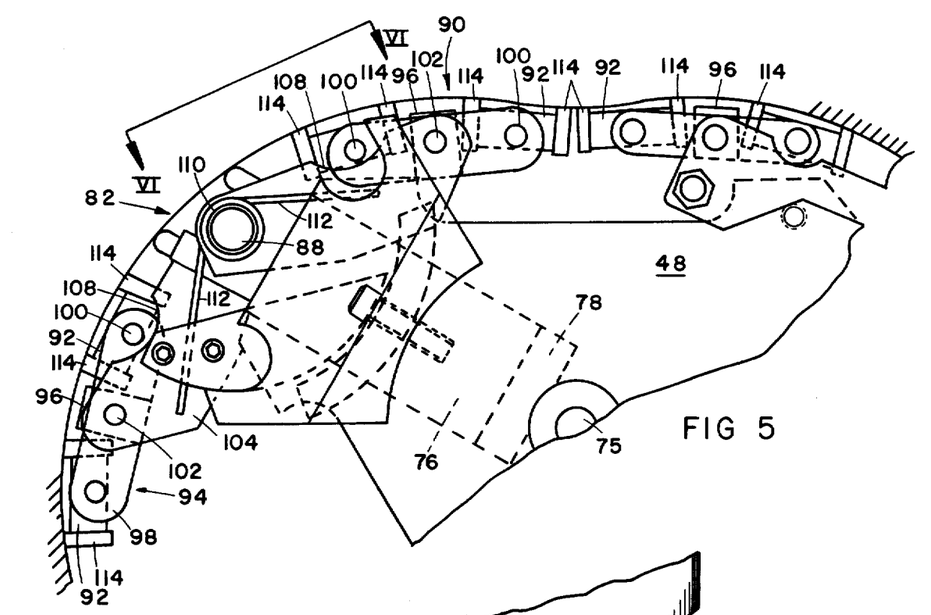
FIG. 5 is a fragmentary plan view of the tool holder and tools in workpiece engaging position.
Figure 6:
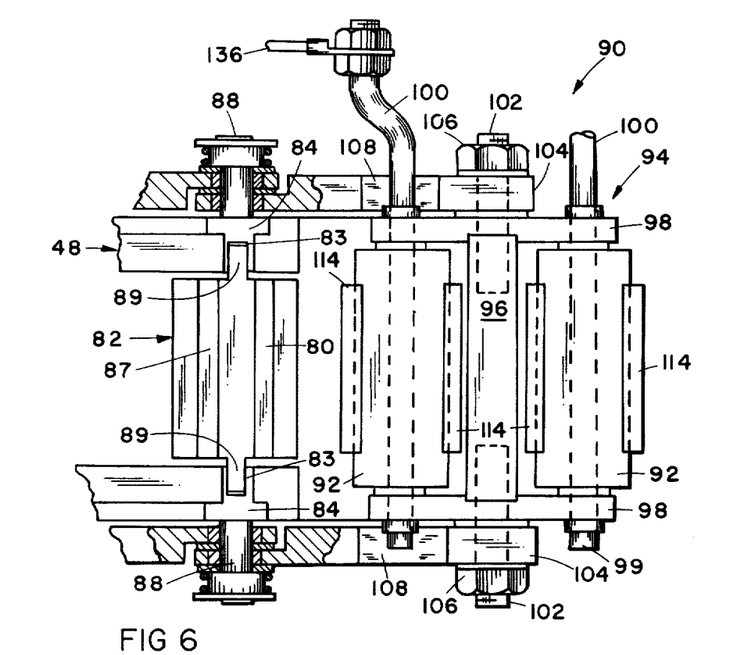
FIG. 6 is a partial end view of the honing and plating tools as viewed along the plane VI—VI of FIG. 5.

Stone holder assembly 82 is positioned at each apex of triangular-shaped tool holder 48. Mounting studs 88 on tool holder 48 extend outwardly from the channel support members 84. These mounting studs pivotally support an articulated anode assembly 90 at each apex (FIGS. 3, 5 and 6). The anode assemblies include a plurality of paired sets of pivotally mounted anode assemblies 92 positioned in a supporting structure on each side of stone assembly 82. Each anode assembly 92 is vertically oriented and pivotally mounted at its ends in a generally I-shaped support bracket 94 (FIG. 6). The support bracket includes a central web section 96 and upper and lower flange members 98. Anodes 92 are povitally mounted on lower flange 98 by studs 99 extending through a suitable opening in the lower flange. At their upper end, anodes 92 are similarly pivotally mounted by elongated stud members 100 which are also adapted for electrical connection to the plating power supply. The central portion of flanges 94 includes outwardly extending threaded stud members 102 in alignment with web 96 which, in turn, are pivotally mounted in upper and lower linking arms 104. Suitable fastening means as nuts 106 secure anode assembly 90 to linking arms 104. Cutouts or recesses 108 in the linking arm allow clearance for studs 100 to pivot about mounting stud 102.

The opposite end of linking arm 104 is pivotally mounted on stud 88 carried by tool holder 48. A bias spring 110 on stud 88 includes a pair of outwardly extending legs 112 secured to linking arms 104 to urge them outwardly with respect to the tool holder to shift the anode members toward the workpiece. Nonconductive, plastic guide and spacing members 114 are adjustably mounted at the sides of each pair of anode members 92 to position and space the anode surfaces in the proper spacial relationship with respect to the workpiece. The articulated linking mechanisms supporting and biasing the anode assembly 90 outwardly together with the pivoted connection of the individual anode members 92 in the supporting framework 94 serves to maintain a predetermined relationship of the anode with respect to the inner surface of the workpiece as the tool holder 48 orbits about the mandrel assembly to follow the curve of the inner surface of the workpiece. The plastic guide and spacer members contact the workpiece surface and maintain the surface of the anode members at a predetermined distance from the surface to provide a gap through which the plating solution flows.

When operated in the plating mode, it is required that suitable electrical connections be provided on the anode and cathode portions of the system. The workpiece itself forms the cathode. A plating solution is pumped into the gap established by guide and spacing members 114 between the anode and the surface being plated. The work-piece is electrically isolated from the supportive framework.

Referring again to FIG. 2, it will be noted that the holding and clamping structure 20, while having its upper fixture member 24 mechanically coupled to the mandrel assembly, is electrically isolated from the mandrel by insulated bushings 30. Similarly, the lower fixture member 22 is electrically isolated from bed 18 of the framework by a sheet of electrical insulating material 116 positioned between the bed and the lower fixture member. The lower fixture is fixed with respect to bed 18 by a suitable electrically isolated clamping means 117. As shown, isolation is maintained through the use of nonconductive bushings 119 and washers 121. The upper portion of the fixture includes the extending guide rods 28 which pass through the previously described insulated bushings 30 located in the triangular-shaped mounting plate 26 carried by a flange on the upper portion of a mandrel assembly. A controlled source of DC power is connected at one side directly to the workpiece by means of a suitable connecting cable 118 (FIG. 3) which may be secured by means of bolts fastened in threaded openings in the workpiece. The lower fixture member itself could serve as the electrically conductive path for the workpiece; however, it is preferable to connect the electrical potential directly to the workpiece.

The opposite side of the electrical circuit includes lead-in wires 120 secured to the mandrel assembly. The electrical connection must be completed to the anode members 92 which are rotated with the tool holder. Accordingly, as shown in FIGS. 2 and 3, a slip ring and brush block assembly 122 is provided to allow a rotating electrical connection between the potential placed on the mandrel and the anodes carried by the tool holder assembly. An electrically conductive ring 124 fixed to the mandrel is electrically connected to lead-in wires 120 through the mandrel structure. The brush assembly 122 rotates about the mandrel with the tool holder assembly and carries a plurality of brushes 128 which are maintained in contact with said ring 124 by a brush retainer spring 130. An electrical conductor 132 extends from each of the brushes to a common buss ring 134 which is mounted on hub assembly 58. Buss ring 134 is secured to the hub by screws 135. Conductor wires 136 complete the connection between buss ring 134 and studs 100 which are connected to each of the anodes 92. In operation, the source of electrical power is connected to conductors 118 and 120, and the path is completed from conductor 118 through the workpiece, the plating solution, anode members 92, studs 100, conductor 136, buss ring 134, conductors 132, brushes 128, ring 124, outer housing 50 of the mandrel, triangular mounting plate 126 and conductor 120.

Figure 7:
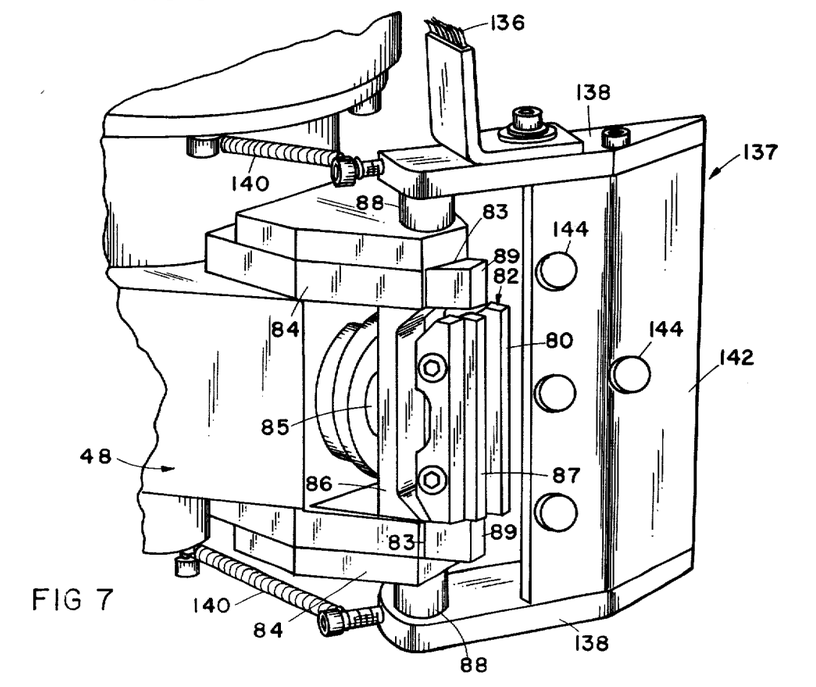
FIG. 7 is a fragmentary perspective similar to FIG. 4 illustrating the mounting of an alternate embodiment of a plating tool.

An alternate construction of an anode assembly carried on the tool holder is illustrated in FIG. 7. In this embodiment, a single anode assembly is associated with each honing stone assembly positioned on each apex of the triangular tool holder. Alternate anode assembly 137 is, as in the previous embodiments, pivotally mounted on stud members 88 by means of linking arms 138 positioned above and below the tool holder. Bias springs 140 are connected between the innermost end of the linking arms and the tool holder to bias the anode element 142 outwardly into engagement with the inner surface of the workpiece. Plastic guide pads 144 fixed on the outer surface of the anode element are of predetermined thickness and control the gap or spacing between the anode element and the surface being plated. Electrical connection is made in the same manner as previously described—i.e., through buss ring 134 and conductors 136 secured to linking arms 138 in a conventional manner.

In each embodiment during plating operations, the electrical power supply is energized and the electroplating begins with a solution containing ions of metal adhering to the inner surface of the workpiece as the current flows between the anode and the cathode (workpiece). Fresh plating solution is continually circulated between the anode and cathode by means of high-velocity pumping action. The liquid flows through the lower fixture through a series of fluid inlet openings 123 (FIG. 2) and into the area defined by the cavity in the workpiece upwardly into container 40 where it flows through outlet 46. Simultaneously with the flow of fluid and the energization of the anode and cathode, the tool holder and the elements carried thereby may be urged to reciprocate and to rotate in an epitrochoidal path to simultaneously hone form and deposit material on the inner surface of the workpiece or perform these operations separately. The plating cycle continues until a predetermined amount of deposition has been achieved. When final size has been generated, electrical power is turned off and the electroplating process ceases. The honing process may continue, however, to generate the final surface finish on the interior surface. For a more detailed description of one type of plating materials and plating method, reference may be had to commonly assigned co-pending application Ser. No. 334,632 filed Feb. 22, 1973 entitled "METHOD FOR CHROME PLATING."

After the desired finishing operations have been performed the mandrel assembly is moved upwardly to shift the upper fixture member 24 out of holding engagement with the workpiece so the workpiece can be removed. Referring again to FIG. 2, as the tool is moved vertically upwardly, it shifts into a cavity 146 formed in the upper fixture member. The cavity has the same configuration as the inner surface of the workpiece but is slightly larger in size and the sidewalls 148 taper inwardly whereby as the tool holding means and the tools carried thereby are shifted upwardly into a retracted position with respect to the workpiece, the plating anodes and/or hones are cammed inwardly away from the inner surface. At this point, supporting plate 26 contacts bushings 32 at the upper ends of guide rods 28 to urge the upper holding fixture 24 away from the workpiece. Container 40 and bellows assembly are, of course, simultaneously shifted upwardly with this movement and the bellows 42 expands as required to allow for such movement.

In the preferred embodiment of the invention, a triangular-shaped tool holder is utilized such that three hone-forming tools may be rotated about the inner periphery of the workpiece. The fixed gear is of a relatively small diameter having a ratio of 2:3 with respect to the ring gear whereby as the cam on the spindle rotates, the tool holder is urged to orbit about the ring gear in the epitrochoidal path. Three complete revolutions of the spindle provide one complete revolution of the tool holding member about the inner surface. In any one revolution of the tool holder, each of the three finishing tools positioned thereon will pass over and operate on any given point within the workpiece.

Figure 8:
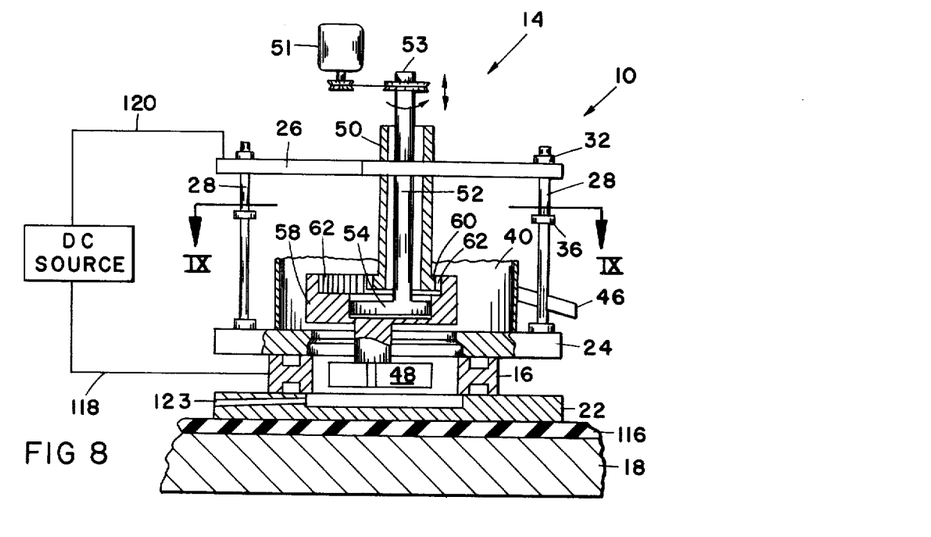
FIG. 8 is a simplified schematic representation of the apparatus.
Figure 9:
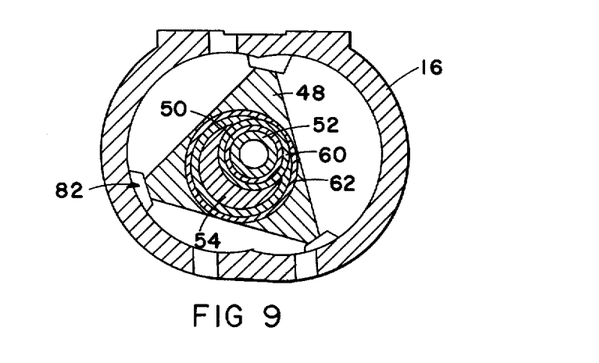
FIG. 9 is a simplified cross-sectional schematic illustration taken along the plane IX—IX of FIG. 8.
Figure 10:
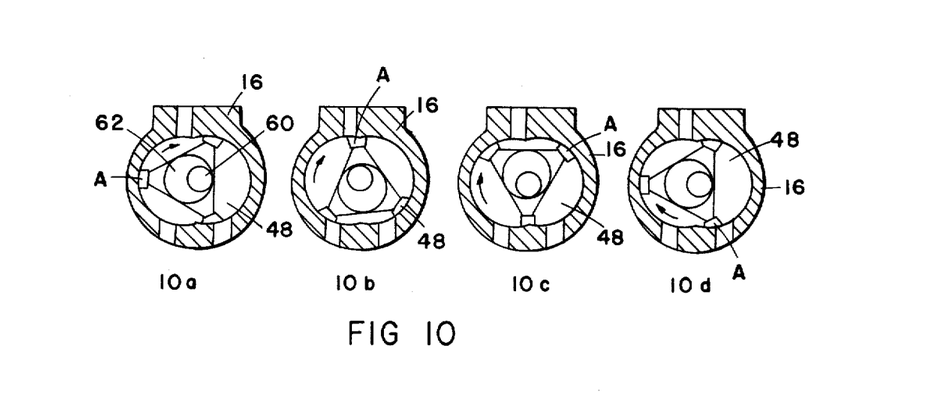
FIG. 10 includes a series of simplified schematic illustrations 10a through 10d showing a complete rotation of the tool holder about the epitrochoidal-shaped inner surface of the workpiece.

Although the operation of this apparatus will be understood from a study of the disclosure materials already explained, a brief description of the rotation of the tool holder and the elements carried thereby will be set forth to assure that the explanation is absolutely clear. Reference may therefore be had to FIGS. 8 through 10 which are simplified schematic illustrations of the invention. The lower fixture member 22 is shown isolated by insulation 116 from the bed of the frame 18. Workpiece 16 mounted on the lower fixture is connected to the DC power source. The opposite side of the source is connected to the triangular-shaped plate 26 on outer housing 50 of mandrel assembly 14. Upper fixture member 24 including guide rods 28 is electrically insulated from support 26 but is carried therewith to clamp workpiece 16 between the upper and lower fixture members. Cam 54 on spindle 52 is shown in operative engagement with the cam follower surface in hub 58 on the upper part of tool holder 48. Stationary gear 60 on the mandrel engages ring gear 62 in hub 58. The tools are schematically shown at the apices of the triangular-shaped tool holder 48.

Referring additionally to FIGS. 10a through 10d, a brief description of one complete revolution of the tool holder is illustrated. A given apex of the triangle upon which one such tool is mounted is identified in each of the figures with the reference letter "A" such that a complete rotation thereof in the epitrochoidal path can be followed. As the spindle and the cam rotate, the tool holder is urged to move in the direction as indicated by the arrows in the figure. The ring gear rotates about the fixed gear on the mandrel so that the given point "A" on the tool holder continuously follows the epitrochoidal shape of the workpiece. Note, for example in FIG. 10a, point "A" on the tool holder is at its furthest distance from the fixed gear. In FIG. 10b, the tool holder has rotated approximately 90° and is at its nearest point with respect to the fixed gear. In FIG. 10c, point "A" continuing its eccentric rotation describes an arc between the elongated and the narrow dimension of the inner surface. In FIG. 10d, the tool mounted at "A" has passed along the surface opposite that shown in FIG. 10a and begins its travel on the side opposite that shown in 10b. Each of the three points on the tool holder are engaging and travel about the epitrochoid-shaped surface to thereby simultaneously perform the desired machining or plating operation thereon.

While the preferred embodiment of the invention disclosed described hone-forming and electro-depositing on a work surface, it will be readily appreciated by those skilled in the art that these operations can be performed independently, simultaneously, or that virtually any machining or finishing operation desired on such a work surface can be performed depending upon the type of tool mounted on the tool holder.

It is conceivable that certain details of this construction may be modified in various ways within the concept presented. It is intended, therefore, that the invention is to be limited only by the scope of the appended claims and reasonably equivalent structures to those defined therein rather than to the specific details of the apparatus depicted as illustrative of the invention.

The embodiments of the invention in which an exclusive privilege of property is claimed are defined as follows:

1. In an apparatus for finishing an epitrochoidal-shaped surface of a workpiece, including:
   a tool holder having finishing tool means mounted thereon;
   means for positioning said workpiece with respect to said tool holder;
   a mandrel, said tool holder being rotatably supported on said mandrel;
   means for eccentrically rotating said tool holder with respect to said mandrel; and
   means for synchronizing the eccentric rotation of said holder with respect to said mandrel whereby said holder will trace an epitrochoidal path, the improvement comprising:
   said finishing tool including at least one finishing element adapted to engage the surface of said workpiece and at least one electrically conductive element positionable with respect to said surface for effecting the deposition of metallic plating thereon; said finishing element comprising at least one abrasive element; means for moving said abrasive element into and out of operative engagement with said surface; means on said conductive element engageable with said surface for spacing said conductive element with respect to said surface; and biasing means for biasing said conductive element toward said surface, whereby said abrasive element and said conductive element will simultaneously follow said surface as said holder is eccentrically rotated.

2. The apparatus of claim 1 and further including a plurality of said abrasive and conductive elements, said tool holder being generally triangular in configuration and wherein said abrasive and conductive elements are mounted at the apices of said tool holder.

3. The apparatus of claim 2 wherein said conductive elements are pivotally mounted at the apices of said tool holder.

4. The apparatus of claim 3 wherein at least a pair of said conductive elements are pivotally mounted at the apices of said tool holder and extending at opposite sides thereof, and wherein each said conductive element is individually articulated for movement by said biasing means toward said surface.

5. The apparatus as set forth in claim 1 wherein said positioning means comprises means for supporting said workpiece and means for clamping said workpiece against said supporting means, said clamping and supporting means including means for forming a flow path whereby plating fluid can be flowed through said workpiece.

6. The apparatus as defined in claim 1 wherein said means for eccentrically rotating said holder comprises:
   a rotatable shaft in said mandrel, said shaft having a cam thereon rotatable therewith; and
   a cam follower in said holder, said cam follower operatively engageable with said cam whereby rotation of said shaft will impart eccentric movement to said holder.

7. The apparatus as defined in claim 6 wherein said synchronizing means includes first and second intermeshing gear means, one of said gear means being fixed with respect to said mandrel, the other of said gear means being fixed with respect to and eccentrically rotatable with said holder.

8. The apparatus as defined in claim 7 wherein said other of said gears is a ring gear fixed on said holder to thereby synchronize the eccentric rotation of said holder about said mandrel upon rotation of said shaft whereby said tool will trace said epitrochoidal path.

9. The apparatus of claim 8 wherein said one of said gear means and said ring gear have a ratio of 2:3 respectively.

* * * * *